Feb. 6, 1968      F. J. JANNETT      3,367,594
SINGLE STATION CAPACITOR WINDER
Filed Sept. 28, 1965      5 Sheets-Sheet 1
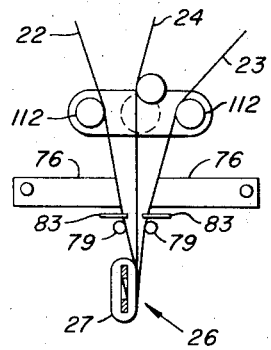
FIG. 5
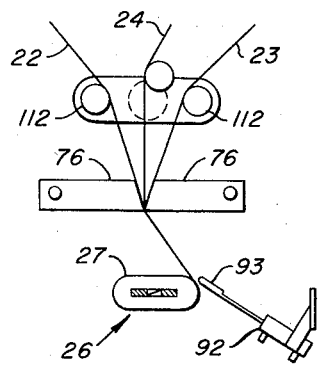
FIG. 6
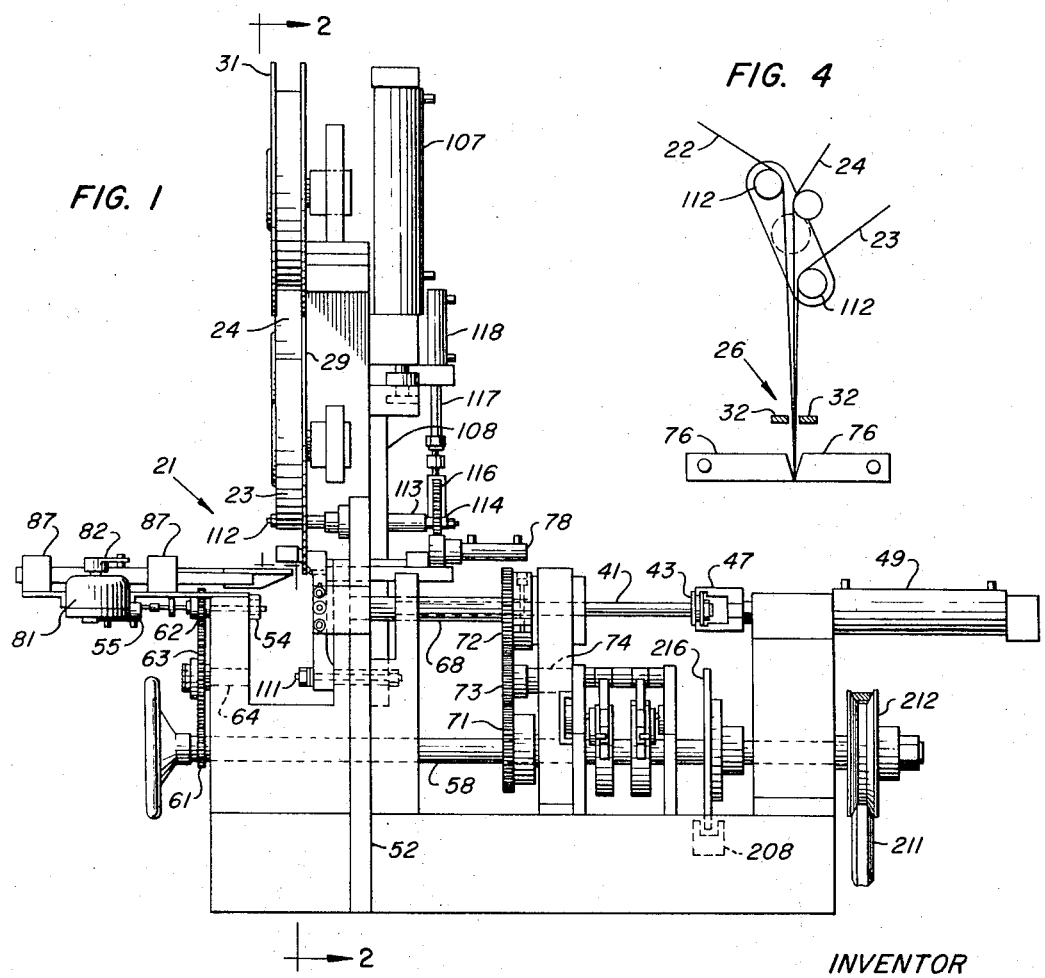
FIG. 1
FIG. 4
INVENTOR
F. J. JANNETT
BY W. L. Williamson
ATTORNEY

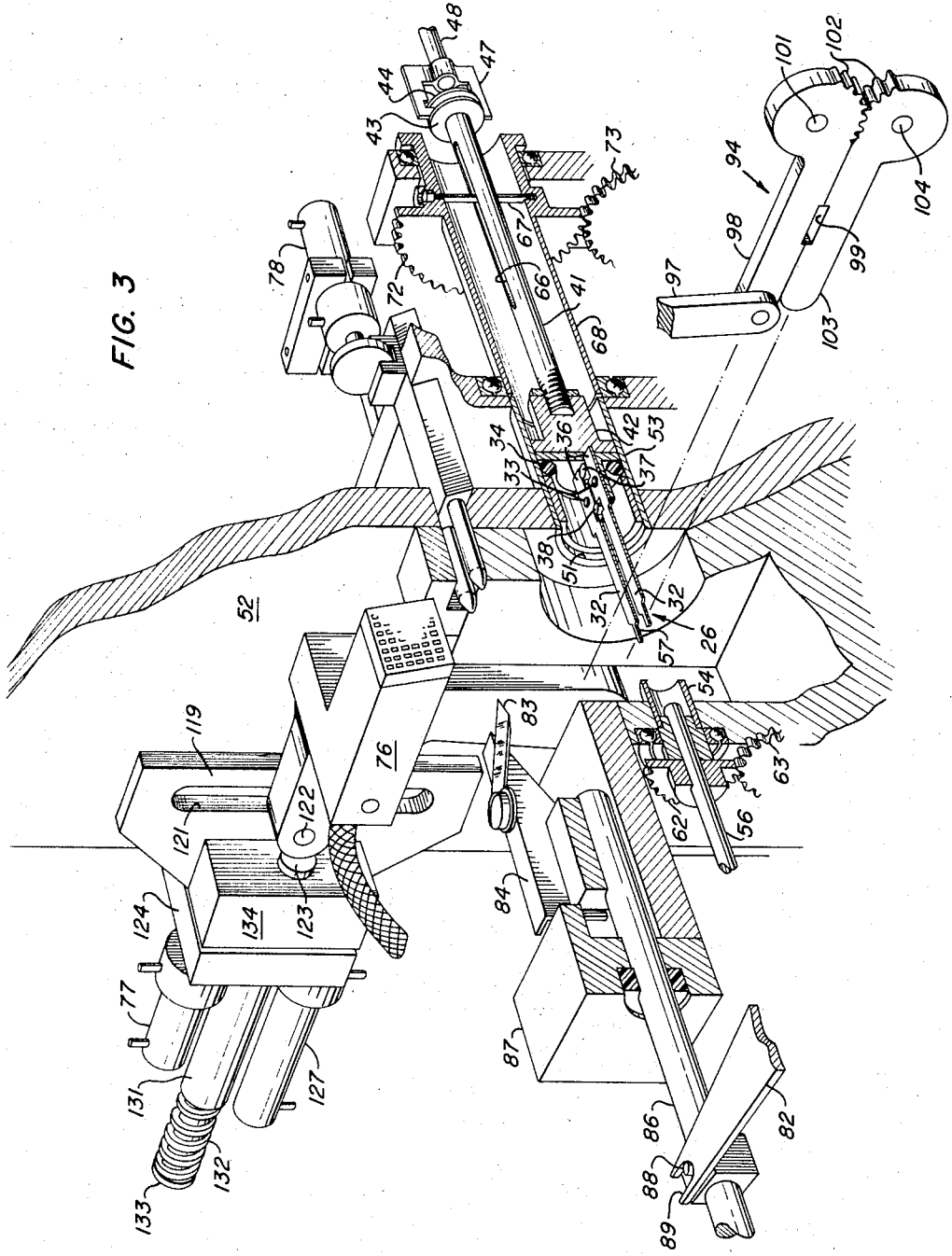

United States Patent Office 3,367,594
Patented Feb. 6, 1968

3,367,594
SINGLE STATION CAPACITOR WINDER
Frederick J. Jannett, West Millington, N.J., assignor to Western Electric Company, Incorporated, New York, N.Y., a corporation of New York
Filed Sept. 28, 1965, Ser. No. 490,927
11 Claims. (Cl. 242—56.1)

ABSTRACT OF THE DISCLOSURE

Wound capacitor bodies are automatically wound at a single station where a plurality of tapes are (1) held in registration with each other, (2) threaded between bifurcated portions of a bifurcated mandrel, (3) wound on the mandrel, (4) cut and sealed to the wound capacitor body, and (5) stripped from the mandrel without displacement to a plurality of work stations. This permits that automatic winding of capacitor bodies at a high rate of speed with a relatively simple, inexpensive and reliable device.

This invention relates to a device for winding strips of material and more particularly to the manufacture of wound capacitor bodies.

In the communications industry large numbers of wound capacitors are used. These capacitors are generally formed by sandwiching a dielectric strip or tape between two suitably insulated conductive strips or tapes and winding the tapes onto a mandrel. Terminals are attached to each conductive tape to form a wound capacitor.

In the manufacture of wound capacitors, difficulty is encountered in starting the tapes on the mandrel to wind successive capacitor bodies, securing the terminal ends of the tapes to each capacitor body, maintaining registration between the tapes throughout the winding of successive capacitor bodies, and removing wound capacitor bodies from the mandrel. In order to provide a capacitor winding machine capable of manufacturing large quantities of capacitor bodies having acceptably uniform electrical properties, it is essential that solutions for these difficulties be found.

It is therefore an object of this invention to provide a device for automatically winding strips of material into a coil.

An additional object of this invention is to provide a device for successively starting strips of material onto a mandrel.

A further object of this invention is to provide a device for severing strips of material and securing them to a wound body.

Another object of this invention is to provide a device for maintaining registration between strips of material throughout successive winding operations.

Still a further object of this invention is to provide a device for removing wound strips of material from a mandrel.

Still an additional object of this invention is to provide a capacitor winding device for successively winding wound capacitor bodies on a mandrel.

With these and other objects in view this invention contemplates providing a bifurcated mandrel which cooperates with facilities for aligning a plurality of tapes substantially in the same plane to permit threading of the tapes between the bifurcated portion of the mandrel.

In addition, facilities may also be provided for severing the tapes subsequent to a winding operation and securing the tapes to the wound body. Additional facilities may be provided for maintaining the tapes in proper registration during successive winding operations and for removing wound bodies from the mandrel.

A more complete understanding of the invention may be had by reference to the following detailed description when taken in conjunction with the attached drawings, wherein:

FIG. 1 is a side elevational view of an apparatus embodying the principles of the invention;

FIG. 3 is a perspective view of the apparatus having portions cut away for greater clarity and showing details of a bifurcated mandrel;

FIG. 4 is an enlarged view taken from FIG. 2 having portions omitted for clarity and showing an operational sequence of the apparatus;

FIG. 5 is the same view as FIG. 4 showing another operational sequence;

FIG. 6 is the same view as FIGS. 4 and 5 showing still another operational sequence;

Figure 8:
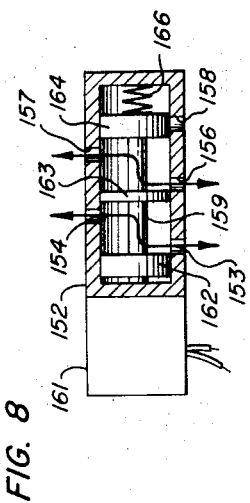
FIGS. 8 and 9 are sectional views of an air valve suitable for actuating an air cylinder of the type shown in FIGS. 10 and 11.
Figure 9:
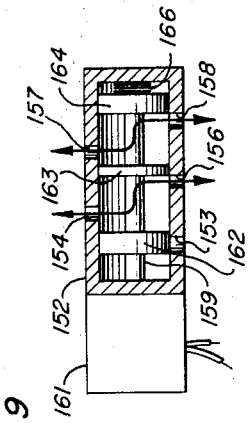
Figure 10:
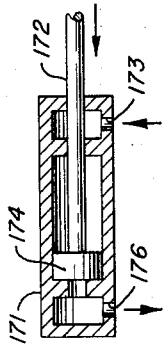
FIGS. 10 and 11 are sectional views of an air cylinder suitable for the operation of the apparatus.
Figure 11:
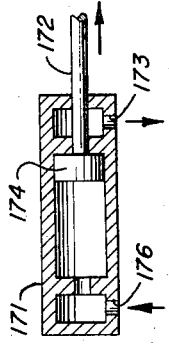
Figure 12:
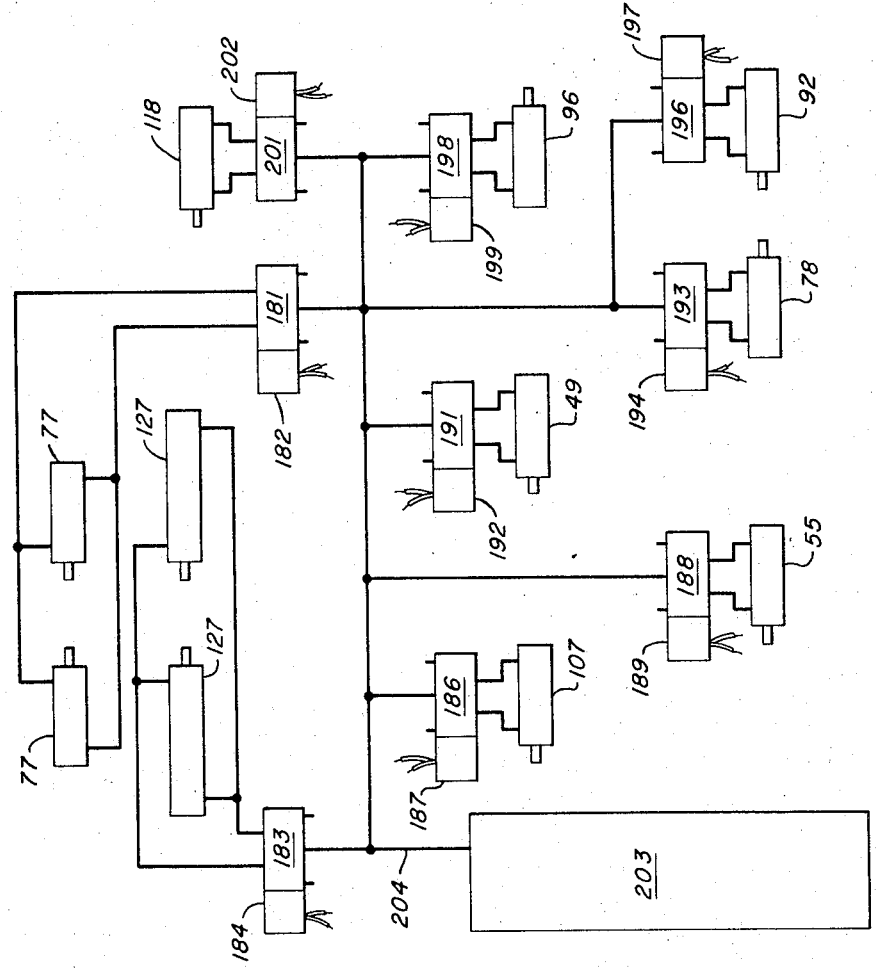
Figure 13:
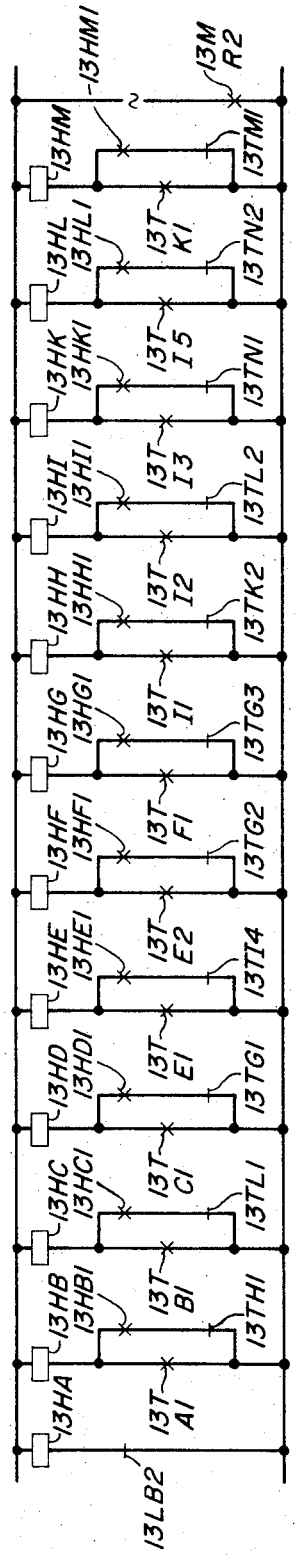
Figure 14:
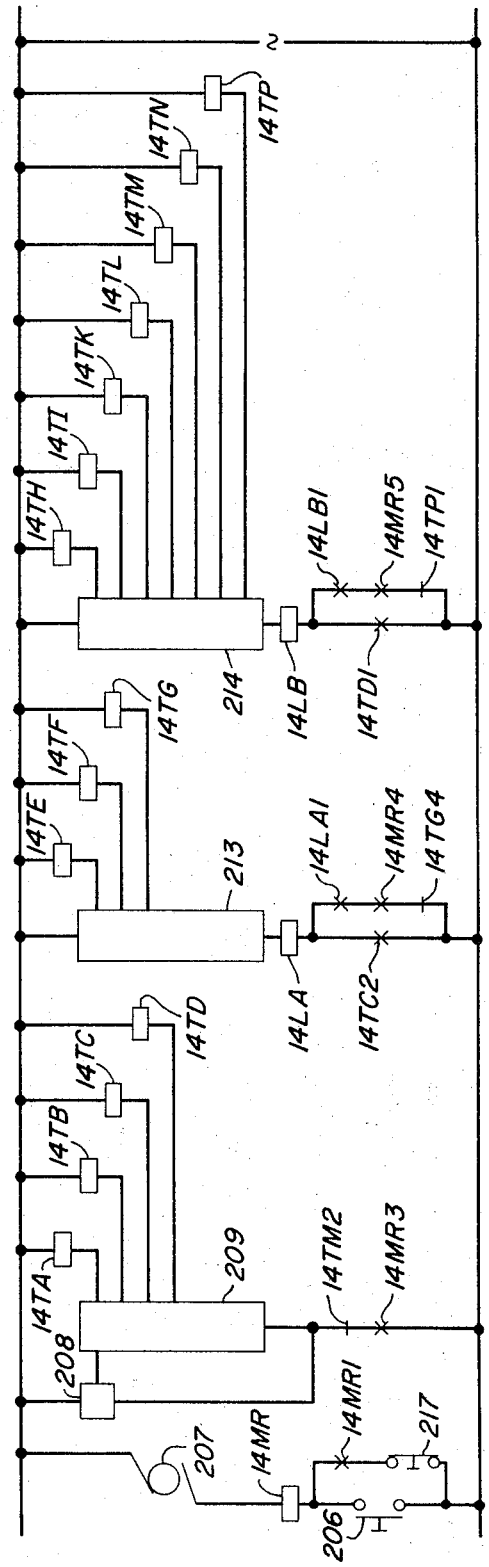

FIG. 12 is a schematic showing how air valves of the type shown in FIGS. 8 and 9 may be interconnected with air cylinders of the type shown in FIGS. 10 and 11 for operating the apparatus; and FIGS. 13 and 14 are schematics showing circuits for controlling sequential operation of the apparatus.

It is to be noted that FIGS. 13 and 14 employ a type of notation referred to as "detached contact" in which a line perpendicular to a circuit lead represents normally closed contacts and X represents normally open contacts, "normally" referring to the unoperated condition of a relay or other contact controlling device, such as a cam or stepping switch. For a complete exposition of this type of notation reference should be made to an article entitled "Improved Detached Contact Circuit Drawing" by F. T. Meyer, vol. 74, Electrical Engineering, p. 645, August 1955.

It is also to be noted that the reference designations of the components appearing in FIGS. 13 and 14 indicate in each instance the number of the figure on which the component is located, the function of the component, and in the case of some components, the component number. For example, as shown in FIG. 13, a holding relay or other contact controlling device may be referred to in the specification as 13HA where the 13 represents the figure on which the relay or other contact controlling device is located and the HA represents the function, such as station A Hold. Also, the contacts of a particular relay or other contact controlling device use the same functional designation as the relay or device which operates such contacts. Since many different sets of contacts may be controlled by one relay or device, the sets of contacts are also represented by another number which designates a particular set of contacts. For example, as shown in FIG. 14 a set of contacts may be referred to as 14MR1, where the 14 indicates the figure on which such contacts are located, the MR is the functional designation of the particular relay or other contact controlling device which operates such contacts, and the 1 indicates a particular set of the contacts. Additionally, if, for example, the contacts are designated 14MR3–5, the 3–5 refers to three sets of contacts numbered from 3 to 5.

Figure 2:
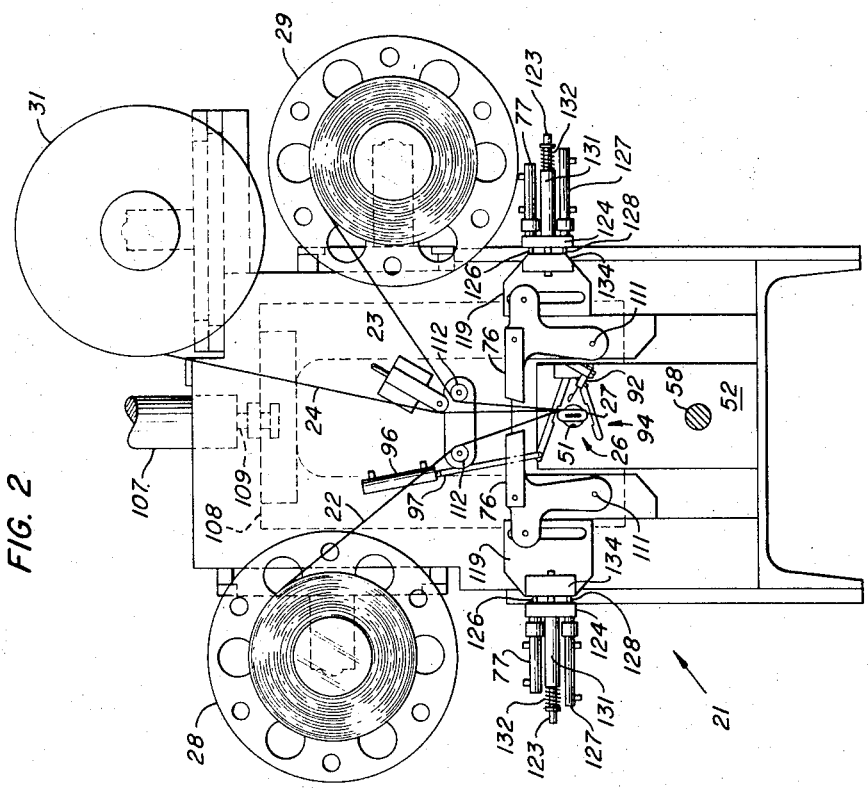
FIG. 2 is a sectional view of FIG. 1 taken along line 2—2.

With reference to FIGS. 1 and 2, a single station capacitor winding machine is generally indicated by the numeral 21. Such a device has general application in winding any number of tapes on a mandrel. However, for convenience of disclosure, the machine is illustrated and described in connection with the winding of three tapes.

The machine 21 winds tapes or strips 22, 23, and 24 on a mandrel, generally designated by the numeral 26, to form a capacitor body 27. The tapes 22 and 23 are laminated tapes having a conductive material such as aluminum foil laminated to an insulating material such as mylar, and the tape 24 is a dielectric material such as mylar. Tapes 22 and 23 are pulled from storage reels 28 and 29, respectively, in such a manner that the conductive sides of the tapes face each other as viewed in FIG. 2. Tape 24 is pulled from storage reel 31 and passes between tapes 22 and 23 so that the tape 24 is sandwiched between the conductive sides of tapes 22 and 23 when the tapes are wound on mandrel 26.

Where it is desirable to wind more than three tapes onto a mandrel, it is only necessary to provide additional storage reels and suitable guides. For example, instead of using the laminated tapes 22 and 23, it may be desirable in some instances to supply the insulating tapes and conductive foils to the mandrel as separate tapes.

Facilities for tensioning the tapes 22, 23, and 24 to maintain essentially the same tension on the tapes as they are pulled from their respective storage reels are desirable. Such tensioning facilities may be simple friction brakes. A highly suitable tensioning device is disclosed in U.S. Patent 3,262,651.

As is most clearly illustrated in FIG. 3, the mandrel 26 has two independent fingers 32—32 which define the bifurcated portion of the mandrel. Each finger 32—32 is pivotally mounted on a pin 33—33. O-ring 34 biases butt portions 36—36 of the fingers 32—32 towards each other about pins 33—33 to urge the fingers 32—32 away from each other. A pin 37 serves as a stop to limit the distance which the O-ring 34 spreads the fingers 32—32 apart and pin 38 serves as a stop to limit the displacement of the fingers 32—32 towards each other.

A shaft 41 is threaded at one end to a mandrel housing 42 and at the other end to a disk 43. The disk 43 has a radial groove 44 for accommodating a connector 47. The connector 47 is threaded onto the free end of a plunger 48.

When air cyclinder 49 (FIG. 1) is actuated to retract plunger 48 to the position shown in FIG. 1, shaft 41 is displaced with plunger 48 to retract the mandrel 26 through an aperture 51 (FIGS. 2 and 3) in faceplate 52 and into a sleeve 53. When air cylinder 49 is actuated to extend plunger 48, shaft 41 is displaced with plunger 48 to extend mandrel 26 through the faceplate 52 and to insert the tip of the mandrel 26 into chuck 54. The mandrel 26 is locked in the chuck 54 by air cylinder 55 (FIG. 1) advancing pin 56 to the right, as viewed in FIG. 3, to insert the pin 56 into slot 57 formed by the fingers 32—32 of mandrel 26.

The mandrel housing 42 and the chuck 54 are simultaneously driven from a common driving shaft 58 (FIG. 1) to rotate the mandrel 26. By driving the mandrel housing 42 and chuck 54 together, any tendency for the mandrel 26 to twist is eliminated.

The chuck 54 is rotatably driven through gears 61, 62, and 63 (FIG. 1). Gear 61 is mounted on driving shaft 58 for rotation therewith and gear 62 is mounted on the chuck 54 for rotation therewith. Gear 63 engages gears 61 and 62 and rotates freely on shaft 64. Thus, rotation of the driving shaft 58 rotates the chuck 54.

The mandrel housing 42 is driven by rotating the shaft 41. Shaft 41 is provided with a longitudinal slot 66 through which slot a pin 67 extends. The pin 67 is fixedly carried by sleeve 68. The sleeve 68 is coaxially mounted with shaft 41 for rotation therewith and is rotatably driven by gears 71, 72, and 73. Gear 71 is mounted on driving shaft 58 for rotation therewith and gear 72 is mounted on the sleeve 68 for rotation therewith. Gear 73 engages gears 71 and 72 and rotates freely on shaft 74. In this manner rotation of driving shaft 58 rotates the sleeve 68.

Rotation of sleeve 68 rotates shaft 41 through pin 67 and, therefore, mandrel 26. The slot 66 permits the mandrel 26 to be extended and retracted without the necessity of displacing the driving mechanism of sleeve 68 and gears 71, 72, and 73.

Plunger 48 does not rotate with shaft 41. Connector 47 is loosely fitted into groove 44 of disk 43 so that disk 43 rotates with shaft 41 without rotating connector 47 and plunger 48. Pin 56 of chuck 54 is connected in an analogus manner to air cylinder 55 so that the air cylinder plunger does not rotate with pin 56.

In FIG. 4 a pair of vacuum heads 76—76 are shown in a closed position to mechanically grip the tapes 22, 23, and 24 and are shown in a lowered position with the tapes threaded between the fingers 32—32 of the mandrel 26. Upon rotation of mandrel 26, the tapes 22, 23, and 24 are wound on the mandrel 26. After the tapes 22, 23, and 24 are started on the mandrel 26, the vacuum heads 76—76 are displaced away from each other to release the tapes and are then raised to the position shown in FIG. 2.

After a predetermined number of revolutions of the mandrel 26, the mandrel 26 is locked in a vertical position as shown in FIGS. 2 and 5. After the mandrel 26 is locked in the vertical position air cylinders 77—77 (FIG. 2) are actuated to displace the vacuum heads 76—76 toward each other from the position shown in FIG. 2 to the position shown in FIG. 5. At the same time, a vacuum is applied at the vacuum heads to suck the tapes 22 and 23 against the vacuum heads thereby tightly gripping the tapes.

While the vacuum heads 76—76 tightly grip the tapes 22 and 23, air cylinder 78 (FIGS. 1 and 3) is actuated to advance pins 79—79 to the left as viewed in FIG. 3. The tapes are threaded between the pins to positively position the tapes 22 and 23 for a cutting operation (FIG. 5). Subsequent to the pins 79—79 positioning the tapes 22 and 23, rotary solenoid 81 (FIG. 1) is actuated to displace arm 82 to the right as viewed in FIG. 1, thereby advancing cutter blades 83—83 to the right.

The cutter blades 83—83 are mounted on a cutter head 84 which, in turn, is mounted on a shaft 86. The shaft 86 slides in bearing blocks 87—87 and is provided with a pin 88 which extends into U-slot 89 of solenoid arm 82. Thus, upon rotary solenoid 81 being actuated to displace solenoid arm 82 to the right, the cutter head 84 is displaced to advance cutter blades 83—83 and to cut tapes 22 and 23 (FIG. 5). The cutter blades 83—83 are mounted on an opposing relationship on the cutter head 84 so as to engage and cut tapes 22 and 23 when the cutter head is displaced to the right. Solenoid 81 is of the type such that upon being deactivated the arm 82 is automatically returned to its original position to retract cutter blades 83—83 to the position shown in FIG. 3.

After the outer tapes 22 and 23 are cut, the cutter blades 83—83 and pins 79—79 are withdrawn as shown in FIG. 3 and the mandrel 26 is again rotated to overwrap tape 24 on capacitor body 27. After a predetermined number of turns, mandrel 26 is locked in a horizontal position as viewed in FIG. 6. The vacuum heads 76—76 which have continued to vacuum grip the outer tapes 22 and 23 are displaced towards each other to mechanically grip all of the tapes between the vacuum heads 76—76 as shown in FIG. 6. An air cylinder 92 is then actuated to advance a heater element 93 which cuts tape 24 and seals the tape to the capacitor body 27.

The flat bifurcated mandrel 26 winds the tapes into a flat capacitor body 27 as shown in FIGS. 1, 5, and 6. Round capacitor bodies may also be wound by the machine 21 by replacing the flat bifurcated mandrel 26 with a round bifurcated mandrel.

In FIG. 3 details of a scissor stripper generally indicated by the numeral 94 are illustrated. Stripper 94 is used to strip the now completed capacitor body 27 from the mandrel 26. Air cylinder 96 (FIG. 2) is actuated to extend plunger 97 thereby lowering scissor blades 98 towards mandrel 26 until the mandrel 26 is positioned in slot 99. Scissor blade 98 is pivoted about pin 101 and is connected through gear teeth 102—102 to scissor blade 103. The scissor blade 103 is pivoted about pin 104 in response to displacement of blade 98 and is displaced toward mandrel 26 at the same rate blade 98 is, until the stripper 94 is closed over the mandrel 26. In this manner, the blades 98 and 103 of the scissor stripper 94 are closed over the mandrel 26 in a position behind the capacitor body 27 and in front of the faceplate 52. Thus, when air cylinder 49 is actuated to retract mandrel 26, the capacitor body 27 is stripped from the mandrel 26 by stripper 94 and falls free.

Before the mandrel 26 is retracted to strip the capacitor body from the mandrel, pin 56 is retracted to release the mandrel 26 from the chuck 54. When the pin 56 is retracted, the tension of the tapes on the mandrel 26 tends to displace the fingers 32—32 of the mandrel 26 towards each other. This facilitates stripping of the capacitor body 27 from the mandrel 26. The pin 38 prohibits the fingers 32—32 of the mandrel 26 from closing completely to pinch the tapes between the fingers 32—32 of the mandrel. This insures easy removal of the capacitor body 27 from the mandrel 26.

With the mandrel 26 in the retracted position shown in FIG. 1 and with the vacuum heads 76—76 in the closed position shown in FIG. 6, an air cylinder 107 is actuated to lower the vacuum heads 76—76 to the position shown in FIG. 4. A U-shaped carriage 108 (FIG. 2) is attached to plunger 109 of the air cylinder 107, and vacuum heads 76—76 are pivotally mounted by pins 111—111 on each end of the U-shaped carriage 108. Thus, as the air cylinder 107 is actuated to extend plunger 109, carriage 108 is lowered to lower vacuum heads 76—76.

After the vacuum heads 76—76 have been lowered to pull the tapes down as shown in FIG. 4, mandrel 26 is extended thereby threading the tapes 22, 23, and 24 between the fingers 32—32 of the mandrel 26.

In order to facilitate threading of the tapes on mandrel 26, guides 112—112 (FIGS. 2 and 4) are rotated to bring tapes 22 and 23 into a generally vertical position (FIG. 4). As is most clearly seen in FIG. 1, guides 112—112 are mounted for rotation on a shaft 113. The shaft 113 extends through faceplate 52 and is rotatably mounted in faceplate 52. A gear 114 is mounted on shaft 113 on the opposite end to guides 112—112. Rack 116 engages the gear 114 and is fixedly mounted to plunger 117 of air cylinder 118. Thus, when air cylinder 118 is actuated to extend plunger 117, rack 116 is advanced to rotate guides 112—112 to the horizontal position shown in FIGS. 2, 5, and 6. When the air cylinder 118 is actuated to retract rack 116, guides 112—112 are rotated to the vertical position shown in FIG. 4. After the tapes are threaded between the fingers 32—32 of mandrel 26, guides 112—112 are rotated to the horizontal position shown in FIGS. 2, 5, and 6 to facilitate the pulling of tapes 22 and 23 from the reels 28 and 29.

Referring primarily to FIGS. 2 and 3, vacuum heads 76—76 are pivotally mounted to the U-shaped carriage 108 by the pins 111—111. The vacuum heads 76—76 are pivoted about these pins by the displacement of mounting fixtures 119—119 and are connected to the mounting fixtures 119—119 through a pin and slot arrangement by slots 121—121 and pins 122—122. The pin and slot arrangement permits the vacuum heads 76—76 to be lowered with carriage 108 without lowering the mounting fixtures 119—119.

Each mounting fixture 119—119 is mounted on a shaft 123—123, and the shafts 123—123 are slidably mounted in bearing blocks 124—124. As discussed supra, to displace the vacuum heads 76—76 to the position of FIG. 5, air cylinders 77—77 are actuated to extend plungers 126—126 (FIG. 2) and displace shafts 123—123, mounting fixtures 119—119, and vacuum heads 76—76 towards each other. To displace the vacuum heads 76—76 to the closed position of FIG. 4, air cylinders 127—127 are actuated to extend plungers 128—128 and displace shafts 123—123, mounting fixtures 119—119, and vacuum heads 76—76 towards each other until the vacuum heads 76—76 mechanically grip the tapes 22, 23, and 24.

As is most clearly seen in FIG. 3, sleeves 131—131 are fixedly mounted to bearing blocks 124—124 to slidably receive shafts 123—123. The sleeves 131—131 act as fixed stops for springs 132—132. The springs 132—132 exert pressure on stops 133—133 carried by shafts 123—123 to continuously urge the vacuum heads 76—76 away from each other. In this manner, upon retraction of plungers 126—126 and 128—128, the vacuum heads 76—76 are returned to the position of FIGS. 1 and 3 by springs 132—132. The plungers 126—126 and 128—128 are not connected to mounting fixtures 119—119 but merely push against blocks 134—134 of mounting fixtures 119—119.

If only air cylinders 77—77 are actuated to extend plungers 126—126, the vacuum heads 76—76 are advanced to the position of FIG. 5. If air cylinders 77—77 and 127—127 are actuated to extend plungers 126—126 and 128—128, the vacuum heads are advanced to the position of FIG. 4 as plungers 128—128 push the mounting fixtures beyond the position of FIG. 5. To return the vacuum heads to the position of FIG. 2, it is necessary that plungers 126—126 and 128—128 be retracted.

Figure 7:
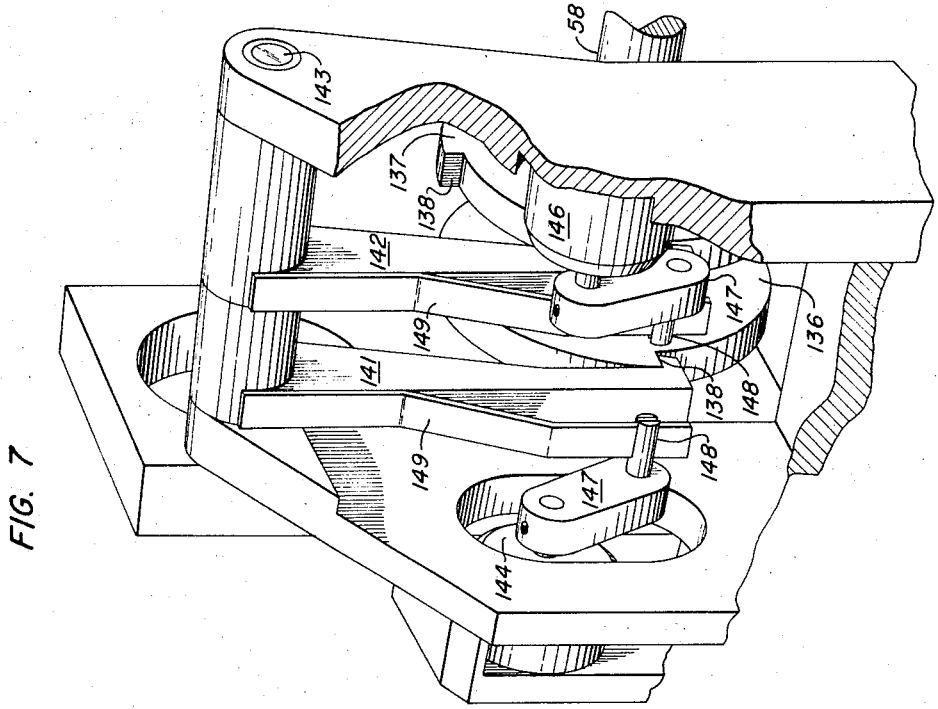
FIG. 7 is an enlarged view taken from FIG. 1 and showing details of a mechanism for locking the bifurcated mandrel against rotation.

In FIGS. 1 and 7 the details of the mechanism for locking the mandrel 26 in the horizontal position of FIG. 4 and the vertical position of FIG. 5 are illustrated. Two cams 136 and 137 are mounted on shaft 58 for rotation therewith. Each cam has a notch 138 and is mounted on shaft 58 so that the notch 138 of cam 137 trails the notch 138 of cam 136 by 90°. Pawls 141 and 142 are independently mounted for pivotal movement on a shaft 143 so as to respectively oppose the notch 138 of cams 136 and 137.

Pawls 141 and 142 are independently advanced by rotary solenoids 144 and 146, respectively, to engage notch 138 of their respective cams 136 and 137. When pawl 141 engages notch 138 of cam 136, shaft 58 is locked against rotation to lock mandrel 26 in the horizontal position of FIG. 6. When pawl 142 engages notch 138 of cam 137, shaft 58 is locked against rotation to lock mandrel 26 in the vertical position of FIGS. 2 and 5.

Rotary solenoids 144 and 146 are provided with rotary arms 147—147. Each arm 147—147 is provided with a slotted pin 148—148 and a spring 149—149 is inserted through the slot of each pin 148—148. The springs 149—149 are mounted on the pawls 141 and 142.

Upon actuation of the rotary solenoids 144 and 146, the rotary arms 147—147 are rotated to displace the springs 149—149 either towards the cams to lock the shaft 58 or away from the cams to release the shaft 58 as the case may be.

The rotary solenoid 144 in its rest position displaces the spring 149 associated therewith towards the pawl 141 to urge the pawl against the cam 136, thereby engaging the notch 138 of cam 136 to lock shaft 58 against further rotation. Upon actuation of rotary solenoid 144 the associated spring 149 is displaced away from pawl 141 to disengage pawl 141 from cam 136, thereby releasing shaft 58. Rotary solenoid 144 is the type of solenoid which returns automatically to its rest position upon being deactivated.

Rotary solenoid 146 in its rest position displaces the spring 149 associated therewith away from the pawl 142 to displace the pawl away from cam 137. Upon actuation of rotary solenoid 146 its associated spring is displaced towards pawl 142 to urge the pawl against the cam 136, thereby engaging notch 138 of cam 136 to lock shaft 58 against rotation. Rotary solenoid 146 is the type of solenoid which returns automatically to its rest position upon being deactivated.

Referring now to FIGS. 8, 9, 10, 11, and 12, the operation of the air cylinders of the capacitor winding machine 21 will be described.

FIGS. 8 and 9 illustrate an air valve 152 suitable for directing air to an air cylinder. The valve 152 is provided with apertures 153, 154, 156, 157, and 158. Valve stem 159 is also the plunger of a solenoid 161. Mounted on the valve stem 159 in a spaced relationship are pistons 162, 163, and 164.

With the plunger 159 retracted, as shown in FIG. 8, piston 162 is positioned to the left of aperture 153, piston 163 is positioned between apertures 154 and 156, and piston 164 is positioned to the right of aperture 157 and over aperture 158. In this position air entering the valve through aperture 156 exits through aperture 157 and air entering the valve through aperture 154 exits through aperture 153.

With the plunger 159 extended, as shown in FIG. 9, piston 162 is positioned to the left of aperture 154 and over aperture 153, piston 163 is positioned between apertures 156 and 157, and piston 164 is positioned to the right of aperture 158. In this position air entering the valve through aperture 156 exits through aperture 154, and air entering the valve through aperture 157 exits through aperture 158.

When plunger 159 is extended spring 166 is compressed to return the plunger 159 to the position of FIG. 8 when solenoid 161 is deactivated.

FIGS. 10 and 11 illustrate an air cylinder 171 of the type which may be used to actuate various facilities of the capacitor winding machine 21. FIG. 10 illustrates the air cylinder 171 with its plunger 172 retracted. In this position air enters the cylinder through aperture 173 to force piston 174 and plunger 172 to the left. Air in the cylinder to the left of piston 174 exits from the cylinder through aperture 176. FIG. 11 illustrates the air cylinder with the plunger 172 extended. In this position air enters the cylinder through aperture 176 to force piston 174 to the right, air in the cylinder to the right of piston 174 exits from the cylinder through aperture 173.

By connecting apertures 154 and 156 of valve 152, respectively, to apertures 176 and 173 of air cylinder 171, the plunger 172 is retracted when the solenoid 161 is deactivated and extended when the solenoid is activated. Conversely, connection of apertures 154 and 157, respectively, to apertures 173 and 176 results in the extension of plunger 172 when solenoid 161 is deactivated and its retraction when the solenoid is activated. Apertures 153 and 158 of valve 152 serve as exhaust ports and apertures 156 as a supply port.

FIG. 12 is a schematic utilizing valves of the type shown in FIGS. 8 and 9 and utilizing air cylinders of the type shown in FIGS. 10 and 11 for controlling the various facilities of the capacitor winding machine 21.

Air cylinders 77—77 for positioning the vacuum heads 76—76 to the position of FIG. 5 are actuated by valve 181 in response to solenoid 182, and air cylinders 127—127 for positioning the vacuum heads 76—76 to the position of FIG. 6 are actuated by valve 183 in response to solenoid 184. The vacuum heads 76—76 are lowered and raised by valve 186 actuating air cylinder 107 in response to solenoid 187.

The mandrel 26 is released from and locked in the chuck 54 by valve 188 actuating air cylinder 55 in response to solenoid 189, and the mandrel 26 is extended and retracted by valve 191 actuating air cylinder 49 in response to solenoid 192.

Pins 79—79 are advanced and retracted to position tapes 22 and 23 by valve 193 actuating air cylinder 78 in response to solenoid 194. Tape 24 is cut and sealed to capacitor body 27 by valve 196 actuating air cylinder 92 to extend and retract heater element 93 in response to solenoid 197. Stripper 94 is opened and closed to strip capacitor body 27 from the mandrel 26 by valve 198 actuating air cylinder 96 in response to solenoid 199.

Guides 112—112 are rotated to position the tapes 22, 23, and 24 by valve 201 actuating air cylinder 118 in response to solenoid 202.

Each of the valves in FIG. 12 is connected to a reservoir of compressed air 203 by a suitable conduit 204. The valves are connected to their respective air cylinders by suitable conduits as illustrated schematically in FIG. 12.

SEQUENTIAL CONTROL CIRCUIT

FIGS. 13 and 14 are schematic drawings of an electrical control circuit for sequentially operating the capacitor winding machine 21. By referring principally to FIGS. 12, 13, and 14, the sequential operation of the capacitor winding machine 21 is described.

Relays 13HA, 13HB, 13HC, 13HD, 13HE, 13HF, 13HG, 13HH, 13HI, 13HK, 13HL, and 13HM operate solenoids 144, 184, 187, 146, 181, 194, 81, 197, 199, 189, 202, and 192, respectively. The solenoids are connected in a conventional manner to a power source and are energized by their respective relay being actuated to close a contact and permit current to flow through the solenoid winding.

The capacitor winding machine 21 is started by depressing switch 206. This energizes motor relay 14MR to close contacts 14MR1, 13MR2, and 14MR3–5. The closing of contact 14MR1 locks relay 14MR into the circuit. This energizes motor 207 which drives shaft 58 through a conventional belt and pulley arrangement wherein the motor 207 drives V-belt 211 to drive pulley 212 and shaft 58 (FIG. 1). The closing of contact 13MR2 energizes the circuit of FIG. 13 and therefore holding relay 13HA. Holding relay 13HA closes a contact (not shown) to energize rotary solenoid 144. This releases cam 136 and permits shaft 58 to begin to rotate, thereby rotating mandrel 26. The closing of contact 14MR3 energizes photoelectric counter 208 (FIG. 1) and timer 209. The closing of contacts 14MR4 and 14MR5 prepares the circuits of timers 213 and 214 for subsequent energization.

The mandrel 26 is released for rotation by cam 136 when the capacitor winding machine is in the position illustrated by FIG. 4 except that guides 112—112 are displaced to the horizontal position of FIG. 2. As the tapes are threaded between the fingers 32—32 of the mandrel and are mechanically gripped by the vacuum heads 76—76, rotation of the mandrel 26 winds the tapes thereon. The vacuum heads 76—76 are opened to release the tapes after the mandrel has made sufficient revolutions to properly start the tapes on the mandrel, for example, four revolutions.

Photoelectric counter 208 is responsive to rotation of driving shaft 58, see FIG. 1. Slotted disk 216 rotates with driving shaft 58 and interrupts a light source (not shown) as it strikes a photocell (not shown) in the photoelectric counter 208. Such counters are conventional.

The timer 209 is responsive to the counter 208 and sequentially actuates timing relays 14TA, 14TB, 14TC, and 14TD in response to counter 208. In this manner sequential operation of the winding machine is controlled in response to rotation of driving shaft 58. Relays 14TA, 14TB, 14TC, and 14TD are only momentarily actuated by timer 209 to momentarily close their respective contacts 13TA1, 13TB1, 13TC1, 14TC2, and 14TD1. Such timers are conventional and can be set to operate a plurality of relays in any desired sequence.

The closing of contact 13TA1 actuates holding relay 13HB. Relay 13HB closes contact 13HB1 to lock the relay in the circuit. Relay 13HB also closes a contact (not shown) to energize solenoid 184 so as to retract plungers 128—128 of air cylinders 127—127 thereby opening vacuum heads 76—76 to release the tapes 22, 23, and 24. By setting timer 209 to actuate timing relay 14TA in response to counter 208 after the desired number of revolutions of the shaft 58, the vacuum heads 76—76 are opened to release the tapes at the proper time.

The closing of contact 13TB1 actuates holding relay 13HC. Relay 13HC closes contact 13HC1 to lock the relay in the circuit. Relay 13HC also closes a contact (not shown) to energize solenoid 187 so as to retract plunger 109 of air cylinder 107 thereby raising vacuum heads 76—76 to the position shown in FIG. 2.

The closing of contact 13TC1 actuates holding relay 13HD. Relay 13HD closes contact 13HD1 to lock the relay in the circuit. Relay 13HD also closes a contact (not shown) to energize rotary solenoid 146 so as to advance pawl 142 into engagement with cam 137 thereby locking driving shaft 58 against further rotation, see FIG. 7. This locks the mandrel 26 in the vertical position shown in FIG. 5.

The timer 209 is set to actuate timing relay 14TC in response to counter 208 when the mandrel 26 has completed sufficient revolutions to wind the desired number of turns of the tapes on the mandrel, for example, 200 turns. In this manner, the mandrel 26 is locked against further rotation upon the desired number of turns being completed.

An additional relay actuated by timer 209 can be provided, if desired, to slow motor 207 down as the desired number of turns is approached to facilitate locking of the mandrel 26 against further rotation. Such a relay can reduce the electrical current to the motor 207 in a conventional manner to achieve the desired reduction in speed.

The closing of contact 14TC2 actuates locking relay 14LA. Relay 14LA closes contact 14LA1 to lock the relay in the circuit as contact 14MR4 is closed. Relay 14LA energizes electrical timer 213. Such timers are conventional and may be set to actuate a plurality of different relays at desired time intervals.

It will be noted that timer 209 has not actuated timing relay 14TD. As shaft 58 is locked against rotation, counter 208 does not operate timer 209. Thus, until shaft 58 is again permitted to rotate, relay 14TD is not actuated.

Timer 213 sequentially actuates timing relays 14TE, 14TF, and 14TG. Relays 14TE, 14TF, and 14TG are only momentarily energized by timer 213 and momentarily actuate their respective contacts 13TE1-2, 13TF, 13TG1-3, and 14TG4.

The closing of contact 13TE1 energizes holding relay 13HE. Relay 13HE closes contact 13HE1 to lock the relay in the circuit. Relay 13HE closes an additional contact (not shown) to energize solenoid 182 so as to extend plungers 126—126 of air cylinders 77—77 thereby closing the vacuum heads 76—76 to the position shown in FIG. 5. Relay 13HE also closes still another contact (not shown) to energize a pump (not shown) to provide a vacuum at the vacuum heads 76—76.

The closing of contact 13TE2 energizes holding relay 13HF. Relay 13HF closes contact 13HF1 to lock the relay in the circuit. Relay 13HF closes an additional contact (not shown) to energize solenoid 194 so as to extend the plunger of air cylinder 78 thereby advancing positioning pins 79—79.

The closing of contact 13TF1 actuates holding relay 13HG. Relay 13HG closes contact 13HG1 to lock the relay in the circuit. Relay 13HG also closes an additional contact (not shown) to energize rotary solenoid 81 thereby advancing cutter blades 83—83 (FIGS. 3 and 5) to cut tapes 22 and 23.

The opening of contact 13TG1 releases holding relay 13HD to unlock the driving shaft 58 and permit rotation of mandrel 26. The opening of contact 13TG2 releases holding relay 13HF to retract positioning pins 79—79. The opening of contact 13TG3 releases holding relay 13HG to retract the cutter blades 83—83. The opening of contact 14TG4 releases locking relay 14LA to reset timer 213. It should be noted that holding relay 13HE is still locked into its circuit so that vacuum heads 76—76 continue to vacuum grip tapes 22 and 23. This insures that proper registration between the tapes is maintained.

As driving shaft 58 is now rotating, counter 208 operates timer 209 to actuate relay 14TD after a predetermined number of revolutions of shaft 58.

The closing of contact 14TD1 energizes locking relay 14LB. Relay 14LB closes contact 14LB1 to lock the relay in the circuit as contact 14MR5 is closed and closes contact 13LB2 to release holding relay 13HA thereby advancing pawl 141 into engagement with cam 136 to lock mandrel 26 in the horizontal position of FIG. 6. In this manner, the tape 24 is overwrapped on the capacitor body 27 a desired number of turns, for example, ten turns. This provides a protective covering for the capacitor body. Relay 14LB also permits the energization of timer 214. Timer 214 is the same type as timer 213.

Timer 214 sequentially actuates timing relays 14TH, 14TI, 14TK, 14TL, 14TM, 14TN, and 14TP. Relays 14TH, 14TI, 14TK, 14TL, 14TM, 14TN, and 14TD are only momentarily energized by timer 214 and momentarily actuate their respective contacts 13TH1, 13TI1-5, 13TK1-2, 13TL1-2, 13TM1, 14TM2, 13TN1-2, and 14TP1.

The opening of contact 13TH1 releases holding relay 13HB to close the vacuum heads 76—76 to the position shown in FIG. 6. The closed vacuum heads 76—76 mechanically grip the tapes 22, 23, and 24 during subsequent operations to insure proper registration of the tapes.

The closing of contact 13TI1 energizes holding relay 13HH. Relay 13HH closes contact 13HH1 to lock the relay in the circuit. Relay 13HH also closes a contact (not shown) which actuates solenoid 197 to advance heater element 93 of air cylinder 92 thereby cutting tape 24 and sealing it to the capacitor body 27. Heater element 93 may be any suitable heater, for example, an electric heater having a sufficient width to contact the entire length of the capacitor body 27. Electrical current can be continuously supplied to the heating element in a conventional manner to maintain a desired temperature, or one of the holding relays, for example, holding relay 13HH may be used to supply electrical current to the heater element at the proper time.

The closing of contact 13TI2 energizes holding relay 13HI. Relay 13HI closes contact 13HI1 to lock the relay in the circuit. Relay 13HI also closes a contact (not shown) which actuates solenoid 199 to advance plunger 97 of air cylinder 96 thereby closing scissor stripper 94 about mandrel 27.

The closing of contact 13TI3 energizes holding relay 13HK. Relay 13HK closes contact 13HK1 to lock the relay in the circuit. Relay 13HK also closes a contact (not shown) which actuates solenoid 189 to retract pin 56 and unlock mandrel 26 from chuck 54 by actuating air cylinder 55.

The opening of contact 13TI4 releases holding relay 13HE to stop the vacuum to vacuum heads 76—76 and to retract plungers 126—126 of air cylinders 77—77. As the plungers 126—126 are retracted, subsequent retraction of plungers 128—128 will permit vacuum heads 76—76 to return to their open position.

The closing of contact 13TI5 energizes holding relay 13HL. Relay 13HL closes contact 13HL1 to lock the relay in the circuit. Relay 13HL also closes a contact (not shown) which actuates solenoid 202 to retract plunger 117 of air cylinder 118 thereby displacing guides 112—112 to the vertical position shown in FIG. 4.

The closing of contact 13TK1 energizes holding relay 13HM. Relay 13HM closes contact 13HM1 to lock the relay in the circuit. Relay 13HM also closes a contact (not shown) which energizes solenoid 192 to retract plunger 41 of air cylinder 49 thereby retracting mandrel 26 to strip the capacitor body 27 therefrom.

It should be noted that the bifurcated structure of mandrel 26 not only facilitates the starting of tapes 22, 23, and 24 on the mandrel but also facilitates removal of the wound capacitor body from the mandrel. As the fingers 32—32 of the mandrel are pivotally mounted, tension of the tapes wound on the mandrel tends to displace the fingers 32—32 towards each other. This permits ready removal of the capacitor body 27 by scissor stripper 94 upon retraction of mandrel 26. Pin 38 insures that the fingers 32—32 do not close on the tapes to pinch the tapes between the fingers 32—32.

The opening of contact 13TK2 releases holding relay 13HH to retract heater 93.

The opening of contact 13TL1 releases holding relay 13HC to lower vacuum heads 76—76 to position shown in FIG. 5. The opening of contact 13TL2 releases holding relay 13HI to open scissor stripper 94. The opening of contact 13TM1 releases holding relay 13HM to extend mandrel 26 into chuck 54. The opening of contact 14TM2 resets timer 209 in preparation for a new cycle.

It should be noted that the vertical position of guides 112—112 displaces the tapes 22 and 23 into substantially the same plane as tape 24. Thus, upon mandrel 26 being extended the tapes are readily threaded between fingers 32—32 of the mandrel. Also, O-ring 34 continually urges the fingers 32—32 apart to insure proper threading of the tapes in the mandrel. Pin 37 insures that the fingers are not displaced so far apart that they do not enter the chuck 54 properly.

The opening of contact 13TN1 releases holding relay 13HK to advance pin 56 into chuck 55 to lock mandrel 26 in the chuck. The opening of contact 13TN2 releases holding relay 13HL to return guides 112—112 to the horizontal position of FIG. 2. Displacing the guides 112—112 to the horizontal position facilitates pulling the tapes 22 and 23 from their storage reels.

The opening of contact 14TP1 releases relay 14LB to reset timer 214 and to release holding relay 13HA thereby releasing driving shaft 58 for rotation.

In this manner, the sequence of operation is repeated until stop switch 217 is depressed. Switch 217 releases the motor relay 14MR to open contacts 14MR1, 13MR2, and 14MR3–5. Contact 14MR1 opens to unlock motor relay 14MR from its circuit. Contact 13MR2 opens to de-energize the circuit of FIG. 13 thereby releasing holding relay 13HA to lock shaft 58 and to release any other holding relays locked into their circuit. Contacts 14MR3–5 open to reset timers 209, 213, and 214, respectively. This returns the capacitor winding machine 21 to its rest position.

It should also be understood that the different facilities of the machine can be operated directly by solenoids without the necessity of using air cylinders. In addition, any suitable gas or fluid operated cylinder can be used. Also, the machine 21 can be operated solely by camming elements thereby eliminating the necessity of solenoids, cylinders, and timers, or any combination of these may be utilized.

It is to be understood that the above-described embodiment is merely illustrative of an application of the principle of the invention and that various modifications will be apparent to those skilled in the art without departing from the principles and scope of the present invention.

What is claimed is:

1. An apparatus for winding strips of material into a coil, comprising:
   a mandrel housing;
   a first finger pivotally mounted on the mandrel housing;
   a second finger pivotally mounted on the mandrel housing in a spaced relationship from the first finger, the fingers defining a bifurcated mandrel;
   means for continuously urging the fingers to pivot away from each other;
   means for supplying strips of material to the mandrel;
   means for guiding the strips of material substantially along a common plane for a predetermined distance;
   means for advancing the mandrel relative to the tapes so that the mandrel intercepts the strips of material at the common plane to thread the strips between the fingers of the mandrel; and
   means for rotating the mandrel to wind the tapes on the mandrel.

2. An apparatus for manufacturing wound capacitor bodies, comprising:
   a mandrel housing;
   a first finger pivotally mounted on the mandrel housing;
   a second finger pivotally mounted on the mandrel housing in a spaced relationship from the first finger, the fingers defining a bifurcated mandrel;
   means for continuously urging the fingers to pivot away from each other;
   means for supplying to the mandrel a dielectric strip intermediate at least two additional strips which form suitably insulated capacitor plates when wound on the mandrel;
   means for guiding the strips substantially along a common plane for a predetermined distance;
   means for advancing the mandrel and strips relative to each other so that the mandrel intercepts the strips at the common plane to thread the strips between the fingers of the mandrel; and
   means for rotating the mandrel to wind the strips on the mandrel.

3. An apparatus for manufacturing wound capacitor bodies, comprising:
   a mandrel housing;
   a first finger pivotally mounted on the mandrel housing;
   a second finger pivotally mounted on the mandrel housing in a spaced relationship from the first finger, the fingers defining a bifurcated mandrel;
   means for continuously urging the finger to pivot away from each other;
   means for supplying to the mandrel a dielectric tape intermediate two laminated tapes, the laminated tapes each having a conductive foil on one side, the conductive foils facing the dielectric tape;
   means for guiding the tapes substantially along a common plane for a predetermined distance;
   means for advancing the mandrel relative to the tapes so that the mandrel intercepts the tapes at the common plane to thread the tapes between the fingers of the mandrel; and
   means for rotating the mandrel to wind the tapes on the mandrel.

4. An apparatus for manufacturing capacitor bodies, comprising:
   a mandrel housing;
   a first finger pivotally mounted on the mandrel housing;
   a second finger pivotally mounted on the mandrel housing a spaced relationship to the first finger, the finger defining the bifurcated portion of a bifurcated mandrel;
   means for continuously urging each finger to pivot about its pivotal mounting to open the bifurcated portion of the mandrel;
   means for supplying to the mandrel a dielectric tape intermediate two suitably insulated conductive tapes;
   means for guiding the tapes substantially along a common plane for a predetermined distance;
   means for advancing the mandrel so that the bifurcated portion thereof intercepts the tapes at the common plane to thread the tapes between the bifurcated portion of the mandrel; and
   means for rotating the mandrel to wind the tapes thereon.

5. An apparatus for manufacturing capacitor bodies, comprising:
   a mandrel housing;
   a first finger pivotally mounted on the mandrel housing;

a second finger pivotally mounted on the mandrel housing in a spaced relationship to the first finger, the finger defining the bifurcated portion of a bifurcated mandrel;

means for continuously urging each finger to pivot about its pivotal mounting to open the bifurcated portion of the mandrel and facilitate the threading of tape therebetween;

means for supplying to the mandrel a dielectric tape intermediate two suitably insulated conductive tapes;

means for guiding the tapes substantially along a common planes for a predetermined distance;

means for advancing the mandrel so that the bifurcated portion thereof intercepts the tapes at the common plane to thread the tapes between the bifurcated portion of the mandrel;

means for receiving the open fingers of the mandrel upon advancement of the mandrel and for spacing the fingers generally parallel to each other; and means for rotating the mandrel to wind the tapes thereon.

6. An apparatus for manufacturing capacitor bodies, comprising:

a mandrel housing;

a first finger pivotally mounted on the mandrel housing;

a second finger pivotally mounted on the mandrel housing in a spaced relationship to the first finger, the finger defining the bifurcated portion of a bifurcated mandrel;

means for continuously urging each finger to pivot about its pivotal mounting to open the bifurcated portion of the mandrel and facilitate the threading of tape therebetween;

means for supplying to the mandrel a dielectric tape intermediate two suitably insulated conductive tapes;

means for guiding the tapes substantially along a common plane for a predetermined distance;

means for advancing the mandrel so that the bifurcated portion thereof intercepts the tapes at the common planes to thread the tapes between the bifurcated portion of the mandrel;

a chuck for receiving the open fingers of the mandrel upon advancement of the mandrel and for spacing the fingers generally parallel to each other;

means for locking the mandrel in the chuck; and means for rotating the mandrel to wind the tapes thereon.

7. An apparatus for manufacturing wound capacitor bodies, comprising:

a mandrel housing;

a first finger pivotally mounted on the mandrel housing;

a second finger pivotally mounted on the mandrel housing in a spaced relationship to the first finger, the first and second fingers defining a bifurcated portion of a mandrel;

means for continuously urging the portion of the fingers defining the bifurcated portion of the mandrel away from each other;

means for supplying to the mandrel a dielectric tape intermediate two suitably insulated conductive tapes;

means for guiding the tapes along substantially the same plane for a predetermined distance;

means for advancing the mandrel relative to the tapes to intercept the tapes at the common plane to thread the tapes between the bifurcated portion of the mandrel;

means for locking the fingers against pivotal movement at a predetermined spacing;

means for rotating the mandrel with the fingers in their locked position to wind a wound capacitor body on the mandrel;

means for unlocking the fingers so that the tension of the tapes on the mandrel displaces the fingers towards each other;

means for limiting the movement of the fingers towards each other to prohibit pinching of the tapes between the fingers;

means for engaging one end of the capacitor body; and means for displacing the mandrel relative to the engaging means to strip the capacitor body from the mandrel.

8. An apparatus for manufacturing wound capacitor bodies, comprising:

a mandrel, means for supplying to the mandrel a dielectric tape intermediate two suitably insulated conductive tapes, means for winding the tapes on the mandrel, means for locking the mandrel against rotation upon completion of a predetermined number of turns of the tapes on the mandrel to form a capacitor body, means for gripping the two conductive tapes so as to maintain proper registration therebetween, means for cutting the two conductive tapes intermediate the mandrel and the gripping means, means for unlocking the mandrel for rotation to wind the dielectric tape over the capacitor body, means for locking the mandrel against rotation upon a predetermined number of turns of the dielectric tape, means for advancing the gripping means to grip the conductive tapes and the dielectric tape to maintain proper registration therebetween, and means for sealing the dielectric tape to the capacitor body and for severing the dielectric tape intermediate the gripping means and the capacitor body.

9. An apparatus for manufacturing wound capacitor bodies, comprising:

a mandrel having two fingers independently mounted in a spaced relationship to define a bifurcated portion of the mandrel, means continuously urging the fingers away from each other, means for supplying to the bifurcated portion of the mandrel a dielectric tape intermediate two suitably insulated conductive tapes, means for guiding the tapes substantially along a common plane for a predetermined distance, means for advancing the mandrel relative to the tapes to intercept the tapes at the common plane and thread the tapes between the bifurcated portion of the mandrel, means for rotating the mandrel to wind the tapes thereon and produce a capacitor body, a first means for locking the mandrel against rotation after a predetermined number of turns of the tapes are wound on the mandrel, means for gripping the two conductive tapes so as to maintain proper registration therebetween, means for cutting the two conductive tapes intermediate the mandrel and the gripping means, means for unlocking the mandrel for rotation to wind the dielectric tape over the capacitor body, a second means for locking the mandrel against rotation after a predetermined number of turns of the dielectric tape, means for advancing the gripping means to grip the conductive tapes and the dielectric tape to maintain proper registration therebetween, and means for sealing the dielectric tape to the capacitor body and for severing the dielectric tape intermediate the gripping means and the capacitor body.

10. An apparatus for manufacturing wound capacitor bodies, comprising:

a mandrel having two fingers independently mounted in a spaced relationship to define a bifurcated portion of the mandrel, means for locking the fingers at a predetermined spacing, means for winding on the mandrel a dielectric tape intermediate two suitably insulated conductive tapes to produce a capacitor body, a first means for locking the mandrel against rotation after a predetermined number of turns of the tapes are wound on the mandrel, means for gripping the two conductive tapes so as to maintain proper registration therebetween, means for cutting the two conductive tapes intermediate the mandrel and the gripping means, means for unlocking the mandrel for rotation to wind the dielectric tape over the capacitor body, a second means for locking the mandrel against rotation after a predetermined number of turns of the dielectric tape are wound on the mandrel, means for advancing the gripping means to grip the conductive tapes and the dielectric tape to maintain proper registration therebetween, means for sealing the dielectric tape to the capacitor body and for severing the dielectric tape intermediate the gripping means and the capacitor body, means for unlocking the fingers of the mandrel so that the tension of the capacitor body on the mandrel displaces the fingers towards each other, means for limiting the movement of the fingers towards each other to prevent pinching of the tapes between the fingers, means for engaging one end of the capacitor body, and means for displacing the mandrel relative to the engaging means to strip the capacitor body from the mandrel.

11. An apparatus for manufacturing capacitor bodies, comprising:

a mandrel housing;

a first finger pivotally mounted on the mandrel housing;

a second finger pivotally mounted on the mandrel housing in a spaced relationship from the first finger, the fingers defining a bifurcated mandrel;

means for continuously urging the fingers to pivot away from each other;

means for supplying to the mandrel a dielectric tape intermediate two suitably insulated conductive tapes;

means for guiding the strips of material substantially along a common plane for a predetermined distance;

means for advancing the mandrel relative to the tapes so that the mandrel intercepts the tapes at the common plane to thread the strips between the fingers of the mandrel;

means for locking the fingers of the mandrel at a predetermined spacing;

means for rotating the mandrel to wind the tapes on the mandrel;

a first means for locking the mandrel against rotation after a predetermined number of turns of the tapes are wound on the mandrel to form a capacitor body;

means for gripping the two conductive tapes so as to maintain proper registration therebetween;

means for cutting the two conductive tapes intermediate the mandrel and the gripping means;

means for unlocking the mandrel for rotation to wind the dielectric tape over the capacitor body;

a second means for locking the mandrel against rotation after a predetermined number of turns of the dielectric tape;

means for advancing the gripping means to grip the conductive tapes and the dielectric tape to maintain proper registration therebetween;

means for sealing the dielectric tape of the capacitor body and for severing the dielectric tape intermediate the gripping means and the capacitor body;

means for unlocking the fingers of the mandrel so that the tension of the capacitor body on the mandrel displaces the fingers towards each other;

means for limiting the movement of the fingers towards each other to prevent pinching of the tapes between the fingers;

means for engaging one end of the capacitor body; and means for displacing the mandrel relative to the engaging means to strip the capacitor body from the mandrel.

References Cited

UNITED STATES PATENTS

| | | | |
|---|---|---|---|
| 1,608,179 | 11/1926 | Marchand | 242—61 |
| 1,881,170 | 10/1932 | Butler | 242—67.2 |
| 2,712,907 | 7/1955 | Hayden et al. | 242—62 |
| 2,925,228 | 2/1960 | Hayner et al. | 242—56.1 |
| 3,163,374 | 12/1964 | Horn et al. | 242—56.1 |

WILLIAM S. BURDEN, *Primary Examiner.*